Jan. 8, 1957
E. G. WALKER
2,776,818
WELL DRILL BIT
Filed Sept. 16, 1953
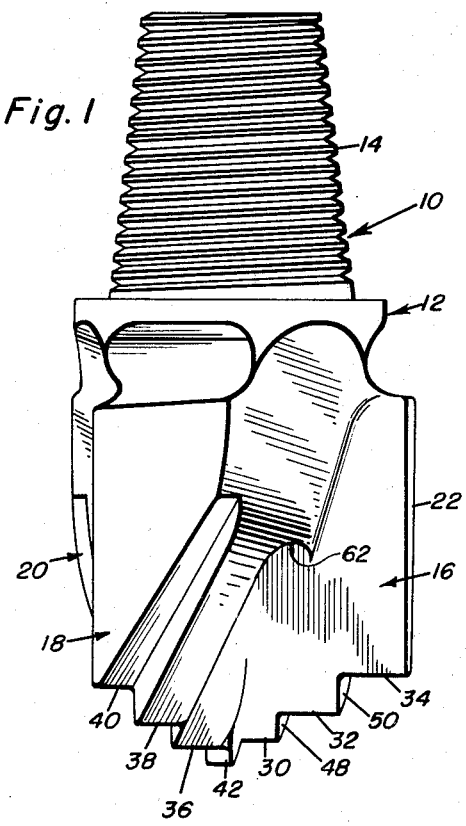
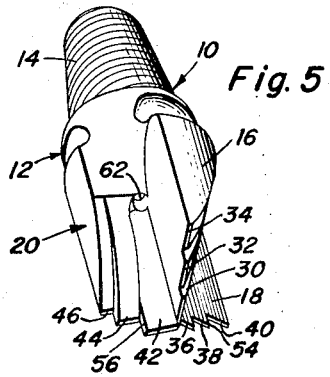
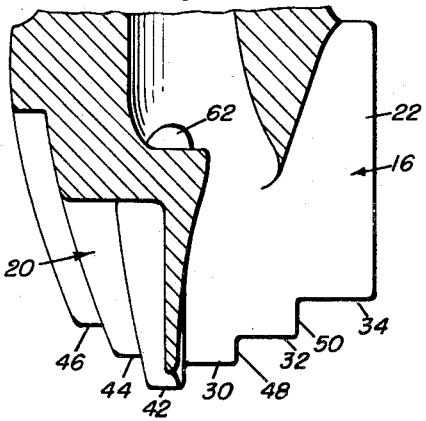
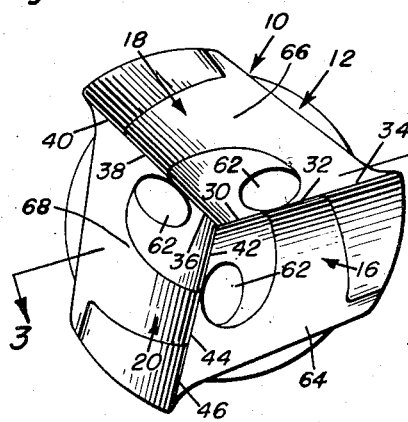
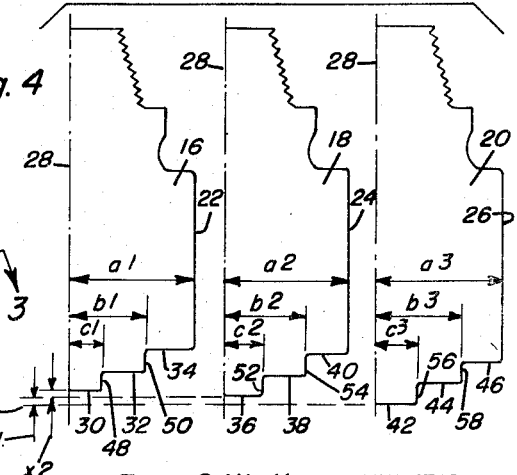
Elzo G. Walker INVENTOR.
BY
Attorneys

2,776,818

WELL DRILL BIT

Elzo G. Walker, Odessa, Tex.

Application September 16, 1953, Serial No. 380,447

2 Claims. (Cl. 255—61)

This invention relates to new and useful improvements and structural refinements in well drill bits, and the principal object of the invention is to provide a drill bit of the character herein described which is equipped with cutting teeth having radially as well as vertically spaced edges, so that during the drilling action perfomed by the bit, the contact of various points of the bit with the earth takes place progressively as the points wear away. In this manner, the drilling operation may be performed more efficiently and wear on the bit is substantially minimized.

Some of the advantages of the invention reside in its simplicity of construction, in its efficient and dependable operation, and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention;

Figure 2 is a lower end view thereof;

Figure 3 is a sectional view taken substantially in the plane of the line 3—3 of Figure 2;

Figure 4 is a diagrammatic illustration illustrating the relative configuration of the three cutting members of the bit; and Figure 5 is a reduced bottom perspective view of the drill bit.

Referring now to the accompanying drawings in detail, the well drill bit is designated generally by the reference character 10 and is preferably formed integrally as an elongated body 12 equipped at the upper end thereof with a screw threaded adapter 14 for connection to the drill line.

A plurality of longitudinally extending, radially projecting cutting members 16, 18, 20 are formed integrally with the body 12 of the bit and the outer longitudinal cutting edges 22, 24, 26 of the members are disposed at equal distances from the longitudinal axis 28 of the body 12, as indicated at $a1$, $a2$, $a3$, in Figure 4.

Each of the cutting members 16, 18, 20 is provided at its lower edge with a series of stepped cutting teeth, the teeth of the member 16 being indicated at 30, 32, 34, while the teeth of the member 18 are indicated at 36, 38, 40, and the teeth of the member 20 are indicated at 42, 44, 46.

As will be clearly apparent from Figure 4, not only are the cutting teeth in each set spaced vertically one from another, but also, the cutting teeth in each set are spaced vertically from the cutting teeth in the other sets, as indicated at $x–1$, $x–2$.

In addition, the cutting teeth have outer side edges 48, 50 for the teeth 30, 32 and 52, 54 for the teeth 36, 38 and 56, 58 for the teeth 42, 44, respectively. As indicated at $b1$, $b2$, $b3$, and $c1$, $c2$, $c3$, in Figure 4, the various side edges of the cutting teeth in each set are spaced radially from the corresponding side edges of the teeth in the other sets with at least the innermost teeth 30, 36 and 42 being of different widths.

As a result, when the drill bit is placed in use, the various cutting teeth, edges, etc., progressively come in contact with the earth so that the drilling operation is more effective and the wear on the drill bit is substantially minimized.

As illustrated in Figure 3, the body 12 as well as the adapter 14 are formed with an axial fluid passage 60 having a plurality of outlet openings 62, in a slope to direct the drilling mud against the face of the cutting teeth.

The edges 30, 36 and 42; 32, 38 and 44; and 34, 40 and 46 define innermost, intermediate and outer teeth on the respective cutter members, the innermost teeth extending radially from the longitudinal axis of the body member, the innermost teeth being stepped with respect to each other and terminating on the longitudinal axis of the body member, the intermediate teeth being stepped with respect to each other and radially at different distances from the longitudinal axis of the body member, and the outer teeth being stepped with respect to each other and extending radially at different distances from an adjacent intermediate tooth on the body member.

The purpose of this particular construction of the various cutting edges is to initially afford the widest cutting edge. Of course, the widest cutting edge at first takes the greatest cutting load and will wear down much more rapidly than the intermediate and smaller cutting edges until such time as the widest cutting edge is worn to the point that it is of the same level as the intermediate cutting edge. At this point, in order not to increase the load required to turn the drill, since the widest edge will then be dull but will cut, the intermediate cutting edge is utilized, creating less drag since it is of less width than the first cutting edge. The cutting action will then progress until such time as both the widest and intermediate cutting edges have reached the same level as the smallest cutting edge where, to offset the drag caused by the dull wide and intermediate cutting edges, the then still sharp cutting edge is of the smallest width. Of course, when the smallest cutting edges in all of the cutting tiers have been dulled, the tool must be removed and resharpened.

It will be noted that each of the cutting members 16, 18 and 20 include a trailing portion 64, 66 and 68, respectively, which slopes upwardly and outwardly from the lower cutting end portions of the cutter members providing a substantial reinforcement for the cutter blade members.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. A well drill bit consisting of an elongated body member, three elongated cutting members extending radially from the longitudinal axis of the body, said cutting members being equidistantly disposed about the longitudinal axis of the body member and terminating in a longitudinal outer cutting edge portion defining the diameter of a hole to be drilled, each cutting member having a leading planar surface portion extending radially from the longitudinal axis of the body member and terminating in the longitudinal outer cutting edge portion, each of the cutting members having a lower cutting end edge portion extending radially from the longitudinal axis of the body member and intersecting the longitudinal outer cutting edge portion, the lower cutting end edge portions comprising a plurality of stepped cutting teeth extending from the longitudinal axis of the body member, the cutting teeth comprising transverse cutting edge portions normal to the longitudinal axis of the body member connected by longitudinal edge portions parallel to the longitudinal axis of the body member, each of the cutting members including an innermost tooth, an intermediate tooth and an outer tooth, said innermost teeth being stepped with respect to each other and terminating on the longitudinal axis of the body member, the transverse cutting edges of the innermost teeth being of a different length with respect to each other, the intermediate teeth being stepped with respect to each other and extending radially at different distances from the longitudinal axis of the body member, and the outer teeth being stepped with respect to each other and extending radially at different distances from an adjacent intermediate tooth on the body member, each cutter member including a trailing portion sloping upwardly and outwardly from the lower cutting end edge portions.

2. A well drill bit as set forth in claim 1 having an axial fluid passage portion extending through the body member, said axial passage portion terminating in a plurality of outlet opening portions opening into the planar surface portions of the cutting members.

References Cited in the file of this patent

UNITED STATES PATENTS

| | | |
|---|---|---|
| 2,504,978 | Henning | Apr. 25, 1950 |
| 2,607,562 | Phipps | Aug. 19, 1952 |
| 2,701,126 | McClennan | Feb. 1, 1955 |

FOREIGN PATENTS

| | | |
|---|---|---|
| 533,343 | Great Britain | Feb. 11, 1941 |